(12) United States Patent
Yoshida

(10) Patent No.: US 6,686,058 B1
(45) Date of Patent: Feb. 3, 2004

(54) COATING STRUCTURE OF A METAL PIPE AND METHOD OF COATING A METAL PIPE

(75) Inventor: Yuichiro Yoshida, Okazaki (JP)

(73) Assignee: Maruyasu Industries Co., Ltd., Nagoya (JP)

( * ) Notice: Subject to any disclaimer, the term of this patent is extended or adjusted under 35 U.S.C. 154(b) by 0 days.

(21) Appl. No.: 10/265,182

(22) Filed: Oct. 4, 2002

(51) Int. Cl.⁷ ................. B32B 15/04; B32B 15/08; B32B 15/18; B32B 1/08

(52) U.S. Cl. ............. 428/626; 428/659; 428/666; 428/35.9; 428/416; 428/421; 428/457; 428/458; 428/461; 428/463; 428/469; 428/472.3

(58) Field of Search ................ 428/626, 658, 428/659, 666, 667, 681, 684, 685, 34.1, 35.7, 35.8, 35.9, 414, 416, 421, 422, 457, 458, 461, 463, 469, 472, 472.3, 474.4, 704, 477.7, 697, 475.8

(56) References Cited

U.S. PATENT DOCUMENTS

| | | | |
|---|---|---|---|
| 5,867,883 A | * | 2/1999 | Iorio et al. .................. 29/460 |
| 6,030,672 A | * | 2/2000 | Usui ........................... 428/35.8 |
| 6,245,183 B1 | * | 6/2001 | Iorio et al. ............. 156/244.14 |
| 6,276,400 B1 | * | 8/2001 | Jackson et al. ............ 138/143 |
| 6,397,896 B2 | * | 6/2002 | Takahashi et al. .......... 138/146 |

FOREIGN PATENT DOCUMENTS

| | | | |
|---|---|---|---|
| JP | 8-294994 | * | 11/1996 |
| JP | 8-294996 | * | 11/1996 |

* cited by examiner

*Primary Examiner*—Michael LaVilla
(74) *Attorney, Agent, or Firm*—Fish & Richardson P.C.

(57) ABSTRACT

On the outer surface of a metal pipe 10 there is formed a zinc plating layer 20 having a predetermined thickness by electroplating method. A coating layer 30 predominantly composed of a chromium compound and a phosphoric acid compound is formed by dipping the metal pipe 10 with layers up to the zincplating layer 20 formed thereon in a coating liquid containing chromium (a source of chromium) and at least one substance selected from the group consisting of oxyacid of phosphorus, oxysalt of phosphorus, anhydride of oxyacid of phosphorus, and anhydride of oxysalt of phosphorus. A fluorocarbon resin layer 40 is formed by coating, with polyvinyl fluoride, the metal pipe 10 with layers up to the coating layer 30 formed thereon and baking at a predetermined temperature for a predetermined time. Thus offered is the coating structure of the metal pipe in which the coating layer 30 comprised of a chromium compound and a phosphoric acid compound prevents brittleness caused by thermal degradation and blocks occurrence of fine cracks, enhancing its anti-corrosivity.

5 Claims, 3 Drawing Sheets

COATING STRUCTURE OF A METAL PIPE AND METHOD OF COATING A METAL PIPE

BACKGROUND OF THE INVENTION

1. Field of the Invention

The present invention relates to a coating structure formed on the outer surface of a metal pipe, and to a method for coating the surface of the metal.

2. Description of the Related Art

There has been a known anti-corrosive coating structure for metal pipes, as disclosed in Japanese Non-examined Patent Publication No.8-75084. In this anti-corrosive coating structure, a zinc plating layer is formed on the outer surface of a metal pipe, and on the zinc plating layer there is formed a coating layer comprised of a trivalent chromium compound. On the coating layer there is formed a resin layer such as polyvinyl fluoride layer, polyvinylidene fluoride layer, or epoxy resin layer. Metal pipes with such coating structure are resistant not only to chemical corrosion but also to chipping and impact. Because of such properties, the metal pipes having the coating structure have been used as pipelines for conveying a brake fluid and fuel in a motor vehicle.

In the above-mentioned coating structure, however, the coating layer is comprised of only a chromium compound. Therefore, the heat treatment conducted in order to bake a resin layer on a metal pipe causes thermal degradation to the coating layer, making the coating layer brittle. This brittleness, which is brought by the ouster of moisture from the coating layer, can cause defects (e.g., fine cracks). Moreover, when metal pipes with brittle coating layer undergo a secondary treatment involving plastic deformation such as termination process or bending process, the risk of causing more defects increases.

As described above, there is a problem that the coating layer with defects is prone to peel off from the plating layer, resulting in the resin layer formed on the coating layer being prone to peel off as well. For instance, when splashed pebbles crash on the metal pipe of a motor vehicle in driving, the impact of the crash can cause the resin layer to peel off. When the resin layer peels off, the coating layer is exposed at the outer surface of the metal pipe. In addition, when the coating layer has defects, substances which corrode the metal pipe (hereafter referred to as corrosive substances) can easily reach the outer surface of the metal pipe. Due to the above reason, the conventional coating structure can cause the metal pipe to rust, without exerting corrosion resistance (hereafter referred to as anti-corrosivity) of the coating layer.

SUMMARY OF THE INVENTION

The present invention was accomplished to solve the above-described problems, and an object thereof is to improve the coating structure of a metal pipe, specifically, to prevent the coating layer from becoming brittle by thermal degradation and to improve anti-corrosivity.

In order to achieve the above-described object, a feature of the present invention resides in a coating structure of a metal pipe comprising a zinc or zinc-nickel plating layer formed on the outer surface of a metal pipe and a coating layer predominantly composed of a chromium compound and a phosphoric acid compound and formed on the zinc or zinc-nickel plating layer.

In this case, applied to the metal pipe may be a single walled steel pipe made of an SPCC steel sheet, a single walled steel pipe or a double walled steel pipe made of an SPCC steel sheet which has been copper-plated in a predetermined layer thickness, a seam welded pipe, a solid-drawn steel pipe, and the like. The wall thickness of the metal pipe may be either thick or thin. The valence of a chromium compound comprising the coating layer is not limited; for instance, a chromium compound having a valence of 3, 6 or the like may be adopted.

Since the coating layer is predominantly composed of a chromium compound and a phosphoric acid compound, the above-described structure can prevent the coating layer becoming brittle by thermal degradation and can enhance anti-corrosivity of the coating layer. Therefore, the metal pipe subjected to secondary treatment requiring plastic deformation thereof can prevent from producing defects (e.g., fine cracks) on its coating layer. The prevention of the defects blocks the entry of corrosive substances to the outer surface of the metal pipe, enabling the coating layer sufficiently exerting its anti-corrosivity. Such coating layer whose anti-corrosivity is enhanced can protect the metal pipe from corrosion over a prolonged period.

Another feature of the present invention lies in that a resin layer is formed on the coating layer in order to protect the coating layer. In this case, the resin layer may be comprised of a polyvinyl fluoride layer or a polyvinylidene fluoride layer. The resin layer may also be comprised of an intermediate layer containing an epoxy resin formed on the coating layer and a polyvinyl fluoride layer or a polyvinylidene fluoride layer formed on the intermediate layer. Further, an outer resin layer containing polypropylene and polyethylene may be formed on the resin layer.

The resin layer may also be comprised of an intermediate layer containing an epoxy resin formed on the coating layer and a polyamide resin layer formed on the intermediate layer. On the resin layer, moreover, there may be formed an outer resin layer containing polypropylene and polyethylene.

In the above-mentioned structure, the resin layer is formed on the thermal-degradation-proof coating layer, securely contacted with the coating layer. Therefore, the resin layer protects the coating layer from corrosion, allowing the treated layer to protect the metal pipe from corrosion for a longer period of time.

In the other aspect of the present invention, a feature of the present invention resides in a method of coating a metal pipe which comprises the steps of forming a zinc or zinc-nickel plating layer on the outer surface of a metal pipe and forming a coating layer on the zinc or zinc-nickel plating layer by dipping the metal pipe with the zinc or zinc-nickel plating layer formed thereon in coating liquid containing chromium (a source of chromium) and at least one substance selected from the group consisting of oxyacid of phosphorus, oxysalt of phosphorus, anhydride of oxyacid of phosphorus, and anhydride of oxysalt of phosphorus.

Furthermore, another feature of the present invention resides in a method of coating a metal pipe which further comprises the step of forming a resin layer on the coating layer.

In this case, the resin layer may be any example selected from the following examples 1 to 6. The resin layer according to an example 1 is comprised of a polyvinyl fluoride layer or a polyvinylidene fluoride layer. The resin layer according to an example 2 is comprised of an intermediate layer containing an epoxy resin formed on the coating layer and a polyvinyl fluoride layer or a polyvinylidene fluoride layer formed on the intermediate layer. The resin layer according to an example 3 has an outer resin layer containing polypropylene and polyethylene formed on the polyvinyl fluoride layer or the polyvinylidene fluoride layer of the example 1. The resin layer according to an example 4 has an outer resin layer comprising polypropylene and polyethylene formed on the polyvinyl fluoride layer or the polyvinylidene fluoride layer of the example 2. The resin layer according to an example 5 is comprised of an intermediate layer containing an epoxy resin formed on the coating layer and a polyamide resin layer formed on the intermediate layer. The resin layer according to an example 6 has an outer resin layer containing polypropylene and polyethylene formed on the polyamide resin layer of the example 5.

The metal pipe having the above-described coating structure (or the metal pipe made by the above-described coating method) resists chemical corrosion, chipping, and impact, exerting excellent effectiveness when applied to a motor vehicle.

DESCRIPTION OF THE PREFERRED EMBODIMENT

Figure 1:
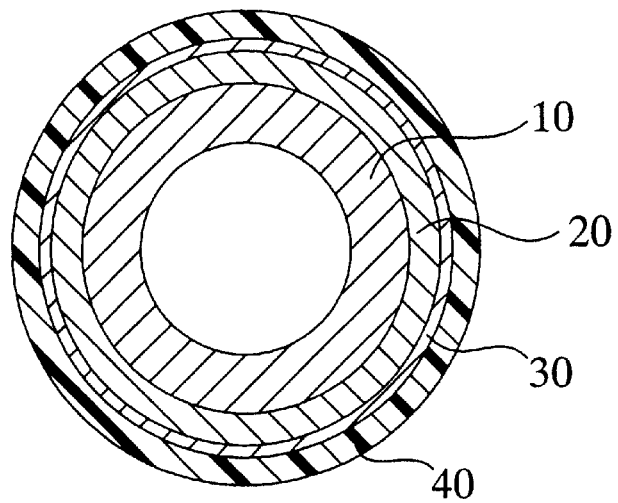
FIG. 1 is a sectional view of a metal pipe provided for explaining a coating structure of a metal pipe according to an embodiment of the present invention.

An embodiment of the present invention will now be described with reference to the drawings. FIG. 1 briefly shows a sectional view of a coating structure of a metal pipe according to the present embodiment. The coating structure is comprised of a zinc plating layer 20 plated on the outer surface of a metal pipe 10, a coating layer 30 formed on the zinc plating layer 20, and a fluorocarbon resin layer 40 formed on the coating layer 30.

The metal pipe 10 is made of an SPCC steel sheet as a single walled steel pipe by the means of roll forming method. The zinc plating layer 20 is formed, by the means of electroplating method, so as to have a predetermined thickness (e.g., 13 µm or more, preferably, approximately 16 µm), by using an acidic electrolyte containing sulfuric acid or an alkaline electrolyte containing zinc cyanide. The coating layer 30 is formed by dipping the metal pipe 10, on which layers up to the zinc plating layer 20 have been formed, in the coating liquid containing trivalent chromium (the source of chromium) and at least one substance selected from the group consisting of oxyacid of phosphorus, oxysalt of phosphorus, anhydride of oxyacid of phosphorus, and anhydride of oxysalt of phosphorus, so as to have a predetermined thickness (e.g., 0.2 µm or less). The coating liquid, which is an aqueous acid solution, is adjusted so as to contain 0.2 g/L to 300 g/L of trivalent chromium such as chromium nitrate (the source of trivalent chromium), and 0.2 g/L to 200 g/L of at least one substance selected from oxyacid of phosphorus, oxysalt of phosphorus, anhydride of oxyacid of phosphorus, and anhydride of oxysalt of phosphorus (e.g., orthophosphoric acid). Preferably, the coating liquid is adjusted so as to contain 0.5 g/L to 80 g/L of trivalent chromium, and 7 g/L to 30 g/L of at least one substance selected from oxyacid of phosphorus, oxysalt of phosphorus, anhydride of oxyacid of phosphorus, and anhydride of oxysalt of phosphorus.

The fluorocarbon resin layer 40 is formed by dispersing polyvinyl fluoride or polyvinylidene fluoride in a solution such as diethyl phthalate and dipping in the solution the metal pipe 10 on which layers up to the coating layer 30 have been formed, so as to have a predetermined thickness (e.g., approximately 20 µm). The metal pipe 10 which has been dipped in the solution is then heated for 20 to 40 seconds at 380° C. in order to solidify the fluorocarbon resin layer 40.

Next explained in detail will be the results of corrosion resistance evaluations of the coating layer 30 containing the above phosphoric acid compound. The presence or absence of thermal degradation will be also described.

Figure 2:
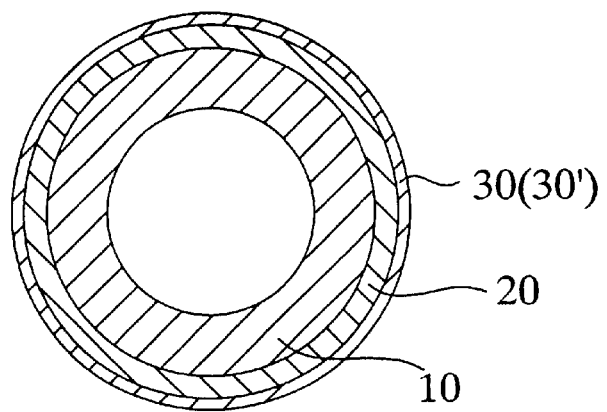
FIG. 2 is a sectional view briefly showing a test specimen and a comparative specimen used in evaluation of corrosion resistance of a coating layer in the coating structure of the metal pipe.

In order to evaluate corrosion resistance of the coating layer 30, as shown in FIG. 2, there are produced samples (hereafter referred to as test specimens) which are the metal pipe 10 on which layers up to the coating layer 30 containing the phosphoric acid compound have been formed by the above means, and other samples (hereafter referred to as comparative specimens) which are the metal pipe 10 on which layers up to the coating layer 30' containing only trivalent chromium compound have been formed. Next, the test specimens and the comparative specimens were divided between a group which was subjected to thermal degradation (hereafter referred to as group 1) and a group which was not subjected to thermal degradation (hereafter referred to as group 2), respectively. The test specimen and the comparative specimen in the group 1 were left at the atmosphere of 150° C. and the state was maintained for 2 hours in order to thermal-degrade the test specimen and the comparative specimen in the group 1. The test specimen and the comparative specimen in the group 2 were left at room temperature, without making any change after their production.

Next, the test specimens and the comparative specimens in the both groups underwent a salt spray test in accordance with the regulations specified by JIS No. Z2371. In the salt spray test, time was counted until a deposited substance predominantly composed of zinc (hereafter referred to as white corrosion) was precipitated. The results are shown in Table 1.

TABLE 1

| | Test samples | Time elapsed before formation of white corrosion |
|---|---|---|
| Group 1 | Comparative specimen | White corrosion was formed before 12 hours have passed |
| | Test specimen | After 48 hours |
| Group 2 | Comparative specimen | After 24 hours |
| | Test specimen | After 144 hours |

As shown in Table 1, the test specimens and the comparative specimens took longer time in the order shown below until white corrosion has formed: the comparative specimen in the group 1, the comparative specimen in the group 2, the test specimen in the group 1, the test specimen in the group 2.

The results of the comparison among the group 1 show that the comparative specimen has exerted corrosion resistance for only 12 hours or less before formation of white corrosion in the salt spray test, while the test specimen has exerted corrosion resistance for 48 hours before formation of white corrosion in the salt spray test. Because of the results, it can be considered that the coating layer 30 containing the phosphoric acid compound sustains fewer effects from thermal degradation, that is, fewer defects (e.g., fine cracks) than the coating layer 30' containing only trivalent chromium does.

Specifically speaking, white corrosion forms by reaction between a corrosive substance contained in salt water (e.g., chlorine) and zinc contained in the zinc plating layer 20. Therefore, it can be considered that when the coating layer 30' containing only trivalent chromium or the coating layer 30 containing the phosphoric acid compound has defects caused by thermal degradation, a corrosive substance can easily enter from the defects, resulting in formation of white corrosion by reaction with zinc in the zinc plating layer 20. Because of this consideration, it can be considered that the test sample which took longer time before formation of white corrosion is less affected by thermal degradation. Therefore, it can be considered that the coating layer 30 containing the phosphoric acid compound sustains fewer effects from thermal degradation than the coating layer 30' containing only trivalent chromium does.

The results of the comparison among the group 2 show that the comparative specimen has exerted corrosion resistance for 24 hours before formation of white corrosion, while the test specimen has exerted corrosion resistance for 144 hours before formation of white corrosion. Because of the results, it can be considered that the coating layer 30 containing the phosphoric acid compound exhibits more excellent anti-corrosivity than the coating layer 30' containing only trivalent chromium.

Specifically speaking, since the comparative specimen and the test specimen in the group 2 have not been degraded by heat, they are considered to have no defects caused by thermal degradation. Therefore, it can be considered that the coating layer 30' containing only trivalent chromium and the coating layer 30 containing the phosphoric acid compound gradually sustain corrosion by salt water as time goes by. This consideration shows that the test sample which took longer time before formation of white corrosion is more excellent in anti-corrosivity. Therefore, it can be considered that the anti-corrosivity of the coating layer 30 has been enhanced by forming the coating layer 30 with chromium compound and phosphoric acid compound contained as primary component.

As described above, the coating structure for the metal pipe according to the present invention, in which the coating layer 30 is comprised of chromium compound and phosphoric acid compound, enables the coating layer 30 to prevent becoming brittle by thermal degradation and to enhance its anti-corrosivity. It is presumed that this is because at the precipitation of chromium compound and phosphoric acid compound, the phosphoric acid compound is precipitated between deposited substances of the chromium compound, resulting in the formation of dense coating layer. Such dense coating layer 30 can reduce occurrence of defects and can exert anti-corrosivity sufficiently. The enhanced anti-corrosivity of the coating layer 30 protects the metal pipe 10 from corrosion over a prolonged period, securing sufficient adhesion between the coating layer 30 and the fluorocarbon resin layer 40. Such properties of the coating layer 30 resist corrosion, protecting the metal pipe 10 for a longer period of time.

The metal pipe 10 according to the above embodiment does not necessarily need to be a single walled steel pipe made of an SPCC steel sheet but may also be a single walled steel pipe or a double walled steel pipe made of an SPCC steel sheet which has been copper-plated in a predetermined layer thickness. Moreover, the metal pipe 10 may also be, for instance, a seam welded pipe or a solid-drawn steel pipe. The wall thickness of the metal pipe 10 is not limited, with either thin pipe or heavy pipe allowed.

In the above embodiment, it is the zinc plating layer 20 that is formed on the outer surface of the metal pipe 10, but a zinc-nickel plating layer may be formed on the outer surface of the metal pipe 10, if necessary. In this case, the structure is the same as the above embodiment except that the coating layer 30 is formed on the zinc-nickel plating layer. Therefore, the same effects as the above embodiment can be attained in this case as well.

In the above embodiment, it is a mixture predominantly composed of trivalent chromium compound and phosphoric acid compound that forms the coating layer 30, but a mixture predominantly composed of hexavalent chromium compound and phosphoric acid compound may comprise the coating layer 30, if necessary. In this case, the structure is the same as the above embodiment except that the hexavalent chromium compound is substituted for trivalent chromium compound. Therefore, the same effects as the above embodiment can be attained in this case as well. However, since the adoption of hexavalent chromium compound poses environmental concerns such as disposal of coating liquid or elution from the metal pipe 10, it is preferable to adopt trivalent chromium compound.

In the above embodiment, the fluorocarbon resin layer 40 is formed on the coating layer 30, but the metal pipe 10 on which layers up to the coating layer 30 have been formed may be applicable, if necessary. In this case, the enhanced anti-corrosivity of the coating layer 30 can protect the metal pipe 10 from corrosion over a prolonged period.

Figure 3:
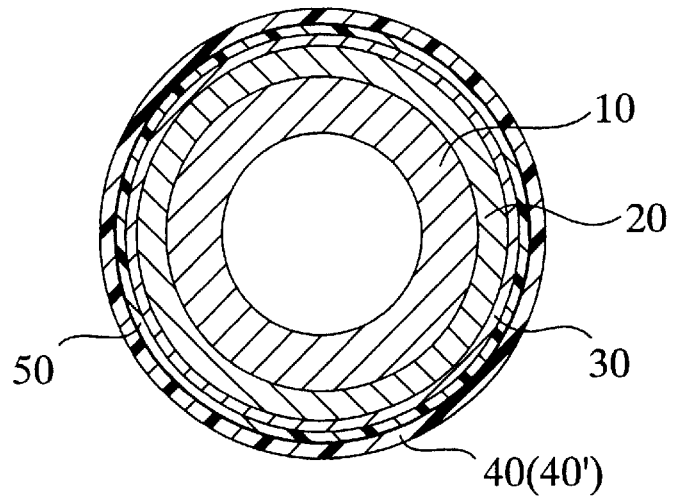
FIG. 3 is a sectional view of the metal pipe provided for explaining a coating structure according to a modified embodiment of the metal pipe.

In the above embodiment, the fluorocarbon resin layer 40 is formed on the coating layer 30, but if necessary, as shown in FIG. 3, on the coating layer 30 there may be formed an intermediate resin layer 50 comprising an epoxy resin and having a predetermined thickness (e.g., approximately 2 to 3 $\mu$m), with the fluorocarbon resin layer 40 formed thereon. In this case, the structure is the same as the above embodiment except that the resin layer consists of the intermediate resin layer 50 and the fluorocarbon resin layer 40. Therefore, the same effects as the above embodiment can be attained in this case as well.

Figure 4:
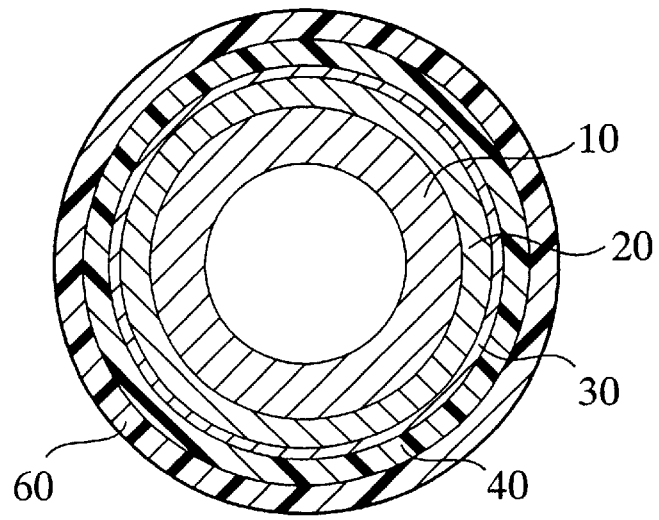
FIG. 4 is a sectional view of the metal pipe provided for explaining a coating structure according to another modified embodiment of the metal pipe.

Alternatively, if necessary, as shown in FIG. 4, an outer resin layer 60 comprising a polypropylene and a polyethylene having a predetermined thickness (e.g., approximately 1 mm) may be formed on the fluorocarbon resin layer 40 of the coating structure shown in FIG. 1. In this case, the structure is the same as the above embodiment except that the resin layer consists of the fluorocarbon resin layer 40 and the outer resin layer 60. Therefore, the same effects as the above embodiment can be attained in this case as well.

Figure 5:
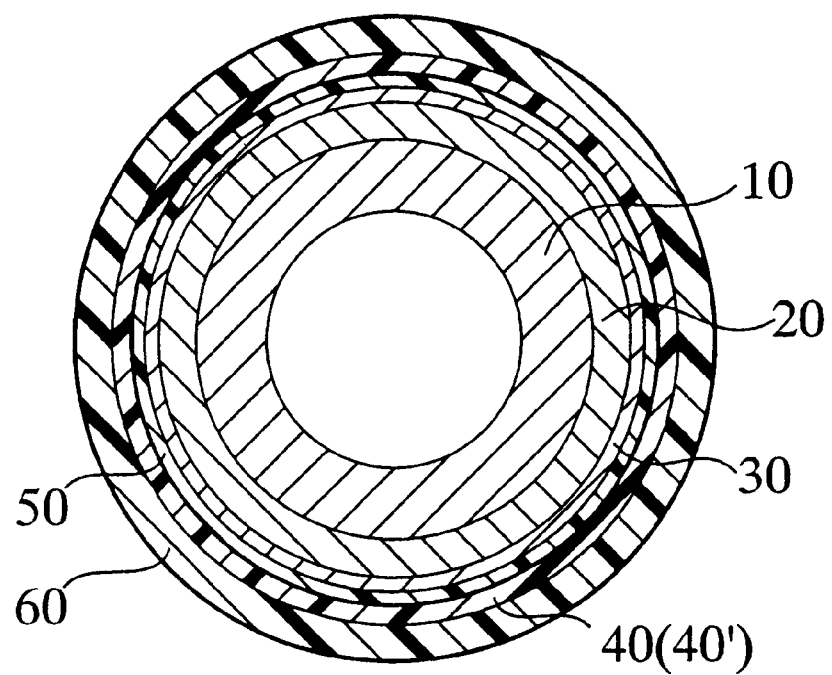
FIG. 5 is a sectional view of the metal pipe provided for explaining a coating structure according to the other modified embodiment of the metal pipe.

Alternatively, if necessary, as shown in FIG. 5, the outer resin layer 60 comprising a polypropylene and a polyethylene may be formed on the fluorocarbon resin layer 40 of the coating structure shown in FIG. 3. In this case, the structure is the same as the above embodiment except that the resin layer consists of the intermediate resin layer 50, the fluorocarbon resin layer 40 and the outer resin layer 60. Therefore, the same effects as the above embodiment can be attained in this case as well.

In the above embodiment, the fluorocarbon resin layer 40 is formed on the coating layer 30, but as shown in FIG. 3, on the coating layer 30 there may be formed the intermediate resin layer 50 with a polyamide resin layer 40' comprising polyamide resin and having a predetermined thickness (e.g., 150 μm or more, preferably approximately 180 μm) formed thereon. In this case, the structure is the same as the above embodiment except that the resin layer consists of the intermediate resin layer 50 and the polyamide resin layer 40'. Therefore, the same effects as the above embodiment can be attained in this case as well.

Alternatively, if necessary, as shown in FIG. 5, the outer resin layer 60 comprising a polypropylene and a polyethylene may be formed on the polyamide resin layer 40' of the coating structure shown in FIG. 3. In this case, the structure is the same as the above embodiment except that the resin layer consists of the intermediate resin layer 50, the polyamide resin layer 40' and the outer resin layer 60. Therefore, the same effects as the above embodiment can be attained in this case as well.

Furthermore, the metal pipe 10 formed as described above resists chemical corrosion, chipping, and impact as aforementioned, exerting excellent effectiveness when applied to a motor vehicle. The metal pipe 10 is understandably suitable for use not only in a motor vehicle but also in other devices which require properties such as chemical corrosion resistance, chipping resistance or impact resistance.

What is claimed is:

1. A coating structure for a metal pipe comprising:

a zinc or zinc-nickel plating layer formed on the outer surface of a metal pipe;

a coating layer predominantly composed of a chromium compound, and a phosphoric acid compound, which are derived from a solution comprising said chromium compound and said phosphoric acid compound, and formed on the zinc or zinc-nickel plating layer, wherein said phosphoric acid compound is at least one substance selected from a group consisting of oxyacid of phosphorus, oxysalt of phosphorus, anhydride of oxyacid of phosphorus and anhydride of oxysalt of phosphorus;

an epoxy resin layer, having an epoxy resin, formed on said coating layer; and a polyvinyl fluoride layer formed on said epoxy resin layer.

2. A coating structure of a metal pipe as defined in claim 1, further comprising an outer resin layer containing polypropylene and polyethylene formed on said polyvinyl fluoride layer.

3. A coating structure of a metal pipe comprising:

a zinc or zinc-nickel plating layer formed on the outer surface of a metal pipe;

a coating layer predominantly composed of a chromium compound, and a phosphoric acid compound, which are derived from a solution comprising said chromium compound and said phosphoric acid compound, and formed on the zinc or zinc-nickel plating layer, wherein said phosphoric acid compound is at least one substance selected from a group consisting of oxyacid of phosphorus, oxysalt of phosphorus, anhydride of oxyacid of phosphorus and anhydride of oxysalt of phosphorus;

an epoxy resin layer containing an epoxy resin formed on said coating layer; and a polyvinylidene fluoride layer formed on said epoxy resin layer.

4. A coating structure of a metal pipe as defined in claim 3, further comprising an outer resin layer containing polypropylene and polyethylene formed on said polyvinylidene fluoride layer.

5. A coating structure for a metal pipe comprising:

a zinc or zinc-nickel plating layer formed on the outer surface of a metal pipe;

a coating layer predominantly composed of a chromium compound and a phosphoric acid compound which are derived from a solution comprising said chromium compound and phosphoric acid compound, and formed on the zinc or zinc-nickel plating layer, wherein said phosphoric acid compound is at least one substance selected from a group consisting of oxyacid of phosphorus, oxysalt of phosphorus, anhydride of oxyacid of phosphorus and anhydride of oxysalt of phosphorus;

an epoxy resin layer containing an epoxy resin formed on said coating layer;

a polyamide resin layer formed on said epoxy resin layer; and an outer resin layer containing polypropylene and polyethylene formed on said polyamide resin layer.

* * * * *